(12) United States Patent
Smith et al.

(10) Patent No.: US 7,267,037 B2
(45) Date of Patent: Sep. 11, 2007

(54) BIDIRECTIONAL SINGULATION SAW AND METHOD

(76) Inventors: David Walter Smith, 11481 E. Bella Vista Dr., Scottsdale, AZ (US) 85259; William Albert Brehm, 6525 N. Shadow Bluff Dr., Tucson, AZ (US) 85704; Steven John DiPrinzio, 11412 N. Twin Spur Ct., Ora Valley, AZ (US) 85737

( * ) Notice: Subject to any disclaimer, the term of this patent is extended or adjusted under 35 U.S.C. 154(b) by 395 days.

(21) Appl. No.: 09/849,049

(22) Filed: May 5, 2001

(65) Prior Publication Data

US 2002/0184982 A1     Dec. 12, 2002

(51) Int. Cl.
*B26D 5/20* (2006.01)
*B26D 1/04* (2006.01)

(52) U.S. Cl. .............. 83/279; 83/280; 83/39; 83/73; 83/576; 83/485; 83/614; 83/884; 125/13.01; 125/20; 125/23.01

(58) Field of Classification Search .......... 83/279, 83/280, 73, 863, 76.1, 169, 367, 368, 370, 83/864, 508.1, 495, 62.1, 452, 75, 76.8, 886, 83/76.6, 929.1, 880–884, 39, 578, 614, 485, 83/76.7; 451/5, 6, 10, 41, 190, 194–197; 125/13.01, 12, 14, 35, 20, 23.01
See application file for complete search history.

(56) References Cited

U.S. PATENT DOCUMENTS

| | | | | |
|---|---|---|---|---|
| 4,407,262 A * | 10/1983 | Wirz et al. | ............... | 125/13.01 |
| 4,631,803 A | 12/1986 | Hunter et al. | ............... | 438/426 |
| 4,688,540 A * | 8/1987 | Ono | ............... | 125/13.01 |
| 5,244,827 A | 9/1993 | Dixit et al. | ............... | 438/431 |
| 5,249,491 A * | 10/1993 | Carter | ............... | 83/13 |
| 5,436,488 A | 7/1995 | Poon et al. | ............... | 257/397 |
| 5,447,884 A | 9/1995 | Fahey et al. | ............... | 437/67 |
| 5,604,159 A | 2/1997 | Cooper | ............... | 438/430 |
| 5,747,866 A | 5/1998 | Ho et al. | ............... | 257/506 |
| 5,780,346 A | 7/1998 | Arghavani et al. | ............... | 438/437 |
| 5,940,717 A | 8/1999 | Rengarajan et al. | ............... | 438/435 |
| 5,950,090 A | 9/1999 | Chen et al. | ............... | 438/424 |
| 6,051,480 A | 4/2000 | Moore et al. | ............... | 438/435 |
| 6,345,616 B1 * | 2/2002 | Umahashi | ............... | 125/13.01 |
| 6,354,912 B1 * | 3/2002 | Osada et al. | ............... | 451/41 |
| 6,357,330 B1 * | 3/2002 | Dass et al. | ............... | 83/863 |
| 6,361,404 B1 * | 3/2002 | Ishiwata et al. | ............... | 451/41 |
| 2001/0029938 A1 * | 10/2001 | Arai et al. | ............... | 125/13.01 |

* cited by examiner

*Primary Examiner*—Boyer D. Ashley
*Assistant Examiner*—Ghassem Alie
(74) *Attorney, Agent, or Firm*—Lawrence Y D Ho & Associates

(57) ABSTRACT

A singulation saw for sawing either substrate or wafers includes a pair of counter-rotating saw blades mounted for independent movement in a vertical direction for alternatively engaging with a substrate to be singulated. The singulation saw further includes a transport system including a pair of substrate carriers reciprocates the substrates. While the first substrate is being cut, the second substrate or other substrate carrier sequentially unloads a cut substrate, loads a new uncut substrate and then moves the uncut substrate to a vision system for determining the position of the substrate relative to the second carrier and then positions the second carrier and its substrate in a standby position ready to be cut by the pair of saw blades that are cutting the first substrate. As the first cut substrate is moved to an unload position, the new uncut substrate is moved into a cutting position.

7 Claims, 11 Drawing Sheets

BIDIRECTIONAL SINGULATION SAW AND METHOD

BACKGROUND OF THE INVENTION

1. Field of the Invention

The present invention relates to an improved singulation saw that is adaptable to be used as a dicing or wafer saw. More particularly, the present invention relates to a novel substrate saw having a plurality of rotating saw blades adapted to cut or saw substrates in two opposite directions of relative movement.

2. Description of the Prior Art

Dicing saws and singulation saws are known. Dicing saws fitted with special saw blades have been used to singulate or separate semiconductor die from a semiconductor wafer mounted on a layer of adhesive on a stretchable plastic film. The dicing saw is preferably programmed to cut streets between rows and columns of die to a depth that penetrates through the wafer into the adhesive layer, thus, completely saw-cutting one die from others. Most prior art saws are designed to saw a single street or cut across a wafer then raise the saw blade and return to the same side and start the next cut.

Advance Packaging (AP) devices include a die and a carrier. The sawn die are mounted onto a carrier such as a substrate or printed circuit (PC board) that is provided with conductive leads and/or conductive balls and/or pins. AP technology includes Ball Grid Array (BGA); Micro BGA (µBGA); Flip-Chip devices; Chip Scale Packaging, etc. All such devices are preferably mounted on the substrate with other AP die devices and need to be singulated one from another.

Quite often the AP devices are separated from each other by wide streets which cannot be cut and removed by wide saw blades. This requires two saw cuts to remove material forming the street that separate the devices. This dual cut street also causes wafer parts and street scrap to fall away or to be projected by the moving saw blade into fragile parts of the dicing saw such as resilient bellows found in dicing saws. A further problem is that the dicing saw must be shut down to remove the scrap that accumulates. Thus, prior art slurry drain systems are not designed to pass substrate scraps and the conversion of dicing saw systems for use in singulating substrates require a complete shut-down and clean-up periodically. Large pieces of stripped substrate cannot be flushed by liquid means as possible when only wafer slurry is present.

Some AP devices are separately encapsulated on a substrate apart from other devices, however, some manufacturers gang encapsulate all AP devices on the substrate with a uniform layer of encapsulating resin such as epoxy which shrinks when passing into the cured state. The gang encapsulated process causes bowing or distortion of the substrate strip and presents problems for the singulation saws when separating one device from another.

Prior art dicing saws have been provided with wafer handlers. When the wafer handler is coupled to one side of the saw it inputs a wafer to be cut and subsequently removes a wafer after it is cut. Such handlers are sometimes called in-and-out handlers. The disadvantage of the in-and-out handler is that no productive sawing can be accomplished during the unloading and reloading of the wafers. When dicing saws are adapted to singulate encapsulated AP devices the same non-productive time occurs for unloading and loading strips or substrates with plural AP devices embedded thereon.

It has been suggested that prior art dicing saws be modified so that the input handler could supply a wafer to be cut at one side of the saw and the output handler could receive a wafer after being cut. No such saw is known to exist because this would require two handlers that take up twice the handler floor space as well as a major redesign of the transport system in the saw itself.

Prior art dicing saws have been provided with two or more saw blades mounted on a single spindle for simultaneously cutting plural paths in a wafer or substrate. This results in a decreased time for cutting a complete wafer. It is not possible to use such systems where very high precision is needed or the street between the devices requires two cuts to remove street material. Further, only when the die being cut is perfectly square and the saw blade is the same width as the street is a multi-blade on one spindle system of practical use.

It would be desirable to provide a new design singulation saw that recognizes and solves all of the above-mentioned problems found in modification or conversion of dicing saws to perform singulation of AP devices. It would be desirable to provide a singulation saw that may be modified or converted for use as a dicing saw while retaining all of the improvements that result in increasing through-put.

SUMMARY OF THE INVENTION

It is a principal object of the present invention to provide a new singulation saw/dicing saw that increases throughput of devices without increasing saw blade speed.

It is another principal object of the present invention to provide a new transport system in a singulation saw/dicing saw that performs loading and unloading during sawing time.

It is a principal object of the present invention to provide a highly efficient singulation saw with a plurality of saw blades, at least two of which are counter-rotational to permit sawing of substrates in two opposite directions of relative movement.

It is a principal object of the present invention to provide a method of partially cutting through thick distorted substrates with the first saw blade in a first direction of cut and then completing the singulation with a different saw blade cutting in a second direction.

It is a principal object of the present invention to provide a substrate scrap or parts removal system which virtually eliminates down time for clean-up and removal of substrate scrap.

It is a principal object of the present invention to provide a novel transport support and positioning system for a bi-directional sawing system which presents and positions substrates to be cut to a rotating saw blade with a minimum loss of transport time.

It is a principal object of the present invention to provide a novel bi-directional sawing system which permits sawing substrates in two directions of relative movement and virtually eliminates the time lost in relocating the saw blade before a second cut.

It is a principal object of the present invention to provide a singulation saw for sawing or singulating substrates into individual devices.

It is a principal object of the present invention to provide a singulation saw having a higher through-put of devices than prior art saws.

It is a principal object of the present invention to provide a novel singulation saw with two separate and distinct saw blades for sawing substrates in different directions of relative movement.

It is a principal object of the present invention to provide a new transport system with separate and distinct substrate carriers whose movement is independently controlled for movement in two directions under a relatively fixed saw blades.

It is a principal object of the present invention to provide a novel singulation saw having two separate and distinct substrate carriers that alternately reciprocate under a pair of alternately cutting saw blades.

According to these and other objects of the present invention there is a provided a pair of counter-rotating saw blades mounted for movement in a vertical direction for alternately engaging with a first substrate to be singulated. A transport system comprising a pair of substrate carriers reciprocates the first substrate under the pair of saw blades and alternate ones of the saw blades are engaged to cut the substrate. While the first substrate is being cut, the second or other substrate carrier sequentially unloads a cut substrate, loads a new uncut substrate and then moves the uncut substrate to a vision system for determining the position of the substrate relative to the second carrier and then positions the second carrier and its substrate in the position ready to be cut by the pair of saw blades that are cutting the first substrate. As the first cut substrate is moved to an unload position, the new uncut substrate is moved into a cutting position with a minimum loss of cutting time.

DESCRIPTION OF THE PREFERRED EMBODIMENT

Figure 1:
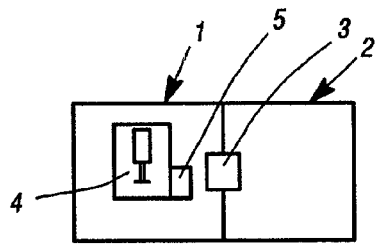
FIG. 1 is a block diagram of a prior art reciprocating wafer saw and an I/O wafer handler that has been converted for a singulation saw.

Refer now to FIG. 1 showing a block diagram of a prior art wafer saw 1 coupled to an in-and-out handler 2 having a load/unload station 3 for loading and unloading wafers cut at the cutting station 5 by the single spindle saw 4.

Figure 2:
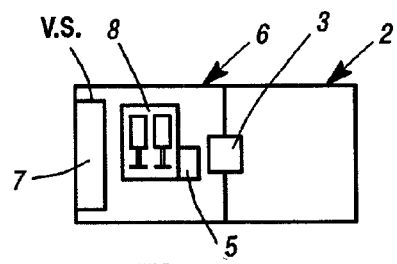
FIG. 2 is a block diagram of the present invention bi-directional singulation saw and an I/O substrate handler that may be converted to a wafer saw.

Refer now to FIG. 2 showing a block diagram of a preferred embodiment of the present invention bi-directional saw showing singulation saw 6 coupled to a prior art type handler 2 adapted for substrates and having a load and unload station 3. The saw 6 comprises a cutting station 5, a vision station 7, and a dual spindle saw 8.

Figure 3:
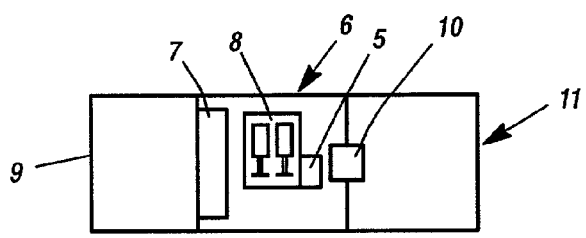
FIG. 3 is a block diagram of another embodiment of the present invention bi-directional singulation saw coupled to an input substrate handler and an output substrate handler for continuous throughput performance.

Refer now to FIG. 3 showing a block diagram of another embodiment of the present invention bi-directional singulation saw 6 coupled to an output handler 11 having an unload station 10. There is shown an input handler 9 coupled to the singulation saw 6 comprising a vision station 7 and a cutting station 5.

Figure 4:
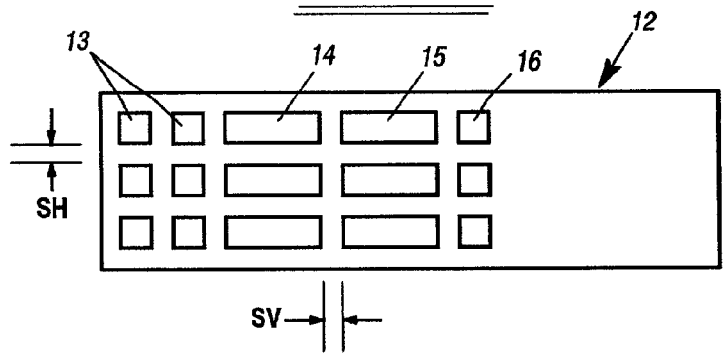
FIG. 4 is a schematic plan view of a substrate used to illustrate a plurality of different sizes of semiconductor devices to be singulated.

Refer now to FIG. 4 showing a schematic plan view of a substrate illustrating a plurality of different type semiconductor devices to be singulated. There are shown square devices 13 separated by wide streets S of H and large rectangular devices 14 separated by wide streets in two directions and two other types of rectangular devices 15 and 16 also separated by vertical streets S of V. It will be understood that this substrate/strip 12 is not typical but is used to illustrate the different types and sizes of devices that present the problems that can be solved by the novel singulation saw making two cuts along each side of the streets S of H and S of V in order to singulate the devices 13 to 16.

Figure 5:
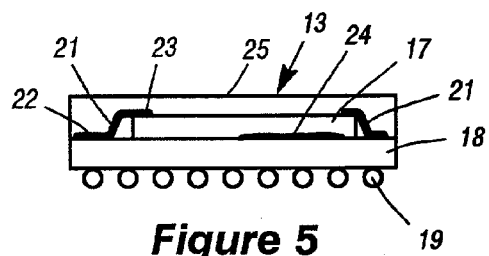
FIG. 5 is an enlarged section in elevation of a singulated Ball Grid Array (GBA) device separated from a substrate.

Refer now to FIG. 5 showing an enlarged section in elevation of a singulated Ball Grid Array (BGA) device 13 comprising a die or semiconductor 17 mounted on a substrate base 18 and showing conductive balls 19 which are connected to the circuitry on the substrate base 18 by vias not shown. Conductive wires 21 are shown connected between lead-out pads 22 and pads 23 on die 17 which connect to circuitry 24 on the substrate base 18. Encapsulation material 25 completely covers the die 17 and its electrical connections to complete a BGA device.

Figure 6:
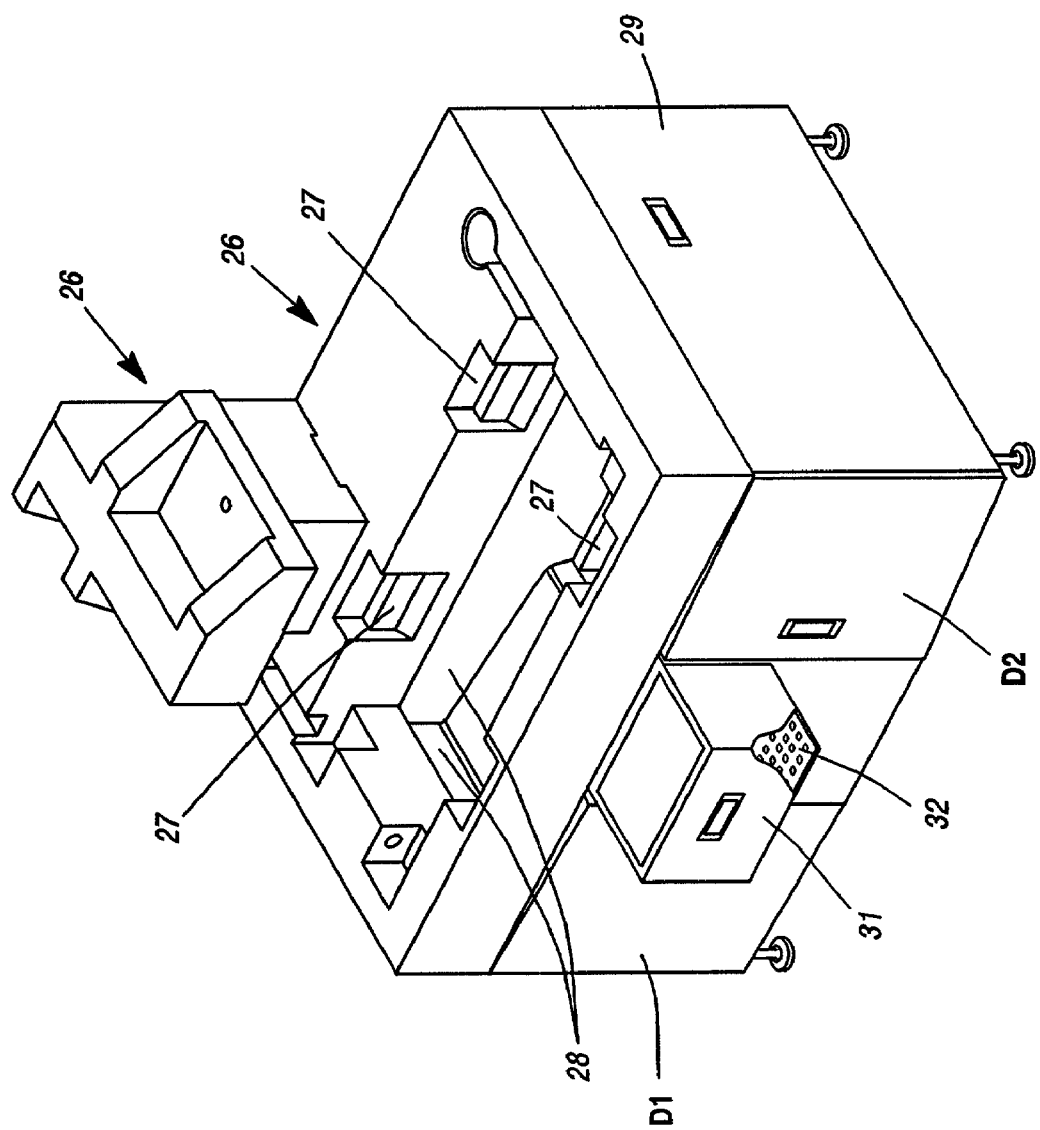
FIG. 6 is an isometric drawing of the present invention singulation saw showing the support cabinet with covers thereon.

Refer now to FIG. 6 showing an isometric drawing the preferred embodiment of the present invention singulation saw base 26, also showing the support cabinet for the base comprising side cover 29, a computer or controller door D1, power supply and amplifier access door D2, a pull-out drawer 31 provided with apertures or drain holes 32 which may be provided in a pull-out basket or sieve. The base 26 is preferably a high-density casting of very high precision and provided with recesses 27 for receiving and accurately positioning transport means and having a sink or basin 28 which empties both slurry and substrate parts of particles or scrap into pull-out drawer 31 so that the singulation saw does not have to be shut down for the purpose of cleaning out passageways below the saw but may be prepared for use by simply emptying the basket or drawer 31.

Figure 7:
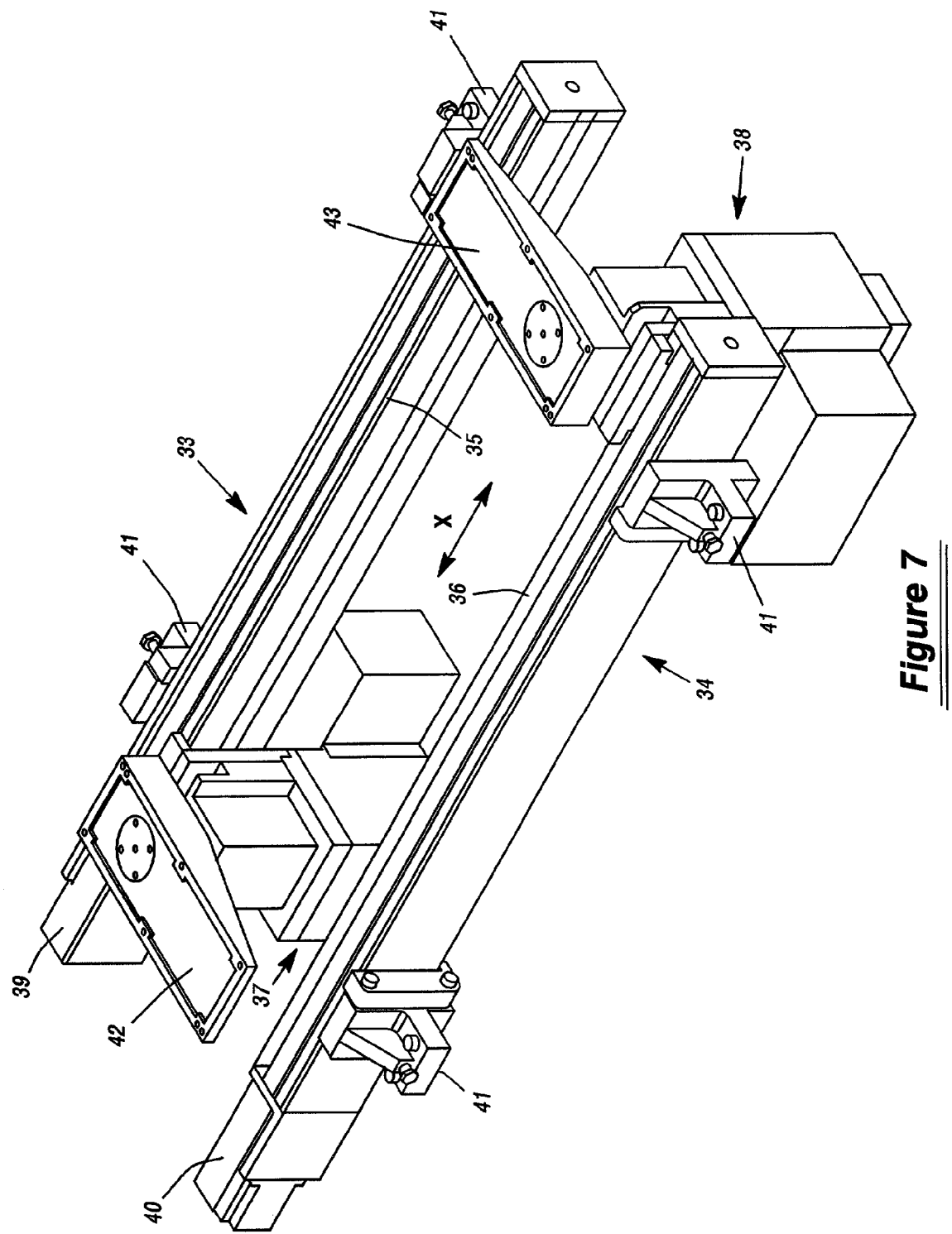
FIG. 7 is an isometric drawing showing a pair of preferred embodiment substrate transport linear actuators operable below a pair of counter-rotating cutting saw blades.

Refer now to FIG. 7 showing an isometric drawing of a pair of substrate transport means 33 and 34 each comprising a pair of carrier supports 37 and 38 and a pair of linear actuators 35 and 36 that are driven by motors 39 and 40. It will be understood that the linear actuators shown employ ball screws and drive motors but may be linear motors for positioning the carrier supports 37 and 38. There are shown four mounting and alignment blocks 41 that slip into the recesses 27 shown in FIG. 6 and are provided with means for fine adjustment and alignment so that the linear actuators 35 and 36 are positioned accurately relative to the rotating saw blades and parallel to each other.

Figure 8:
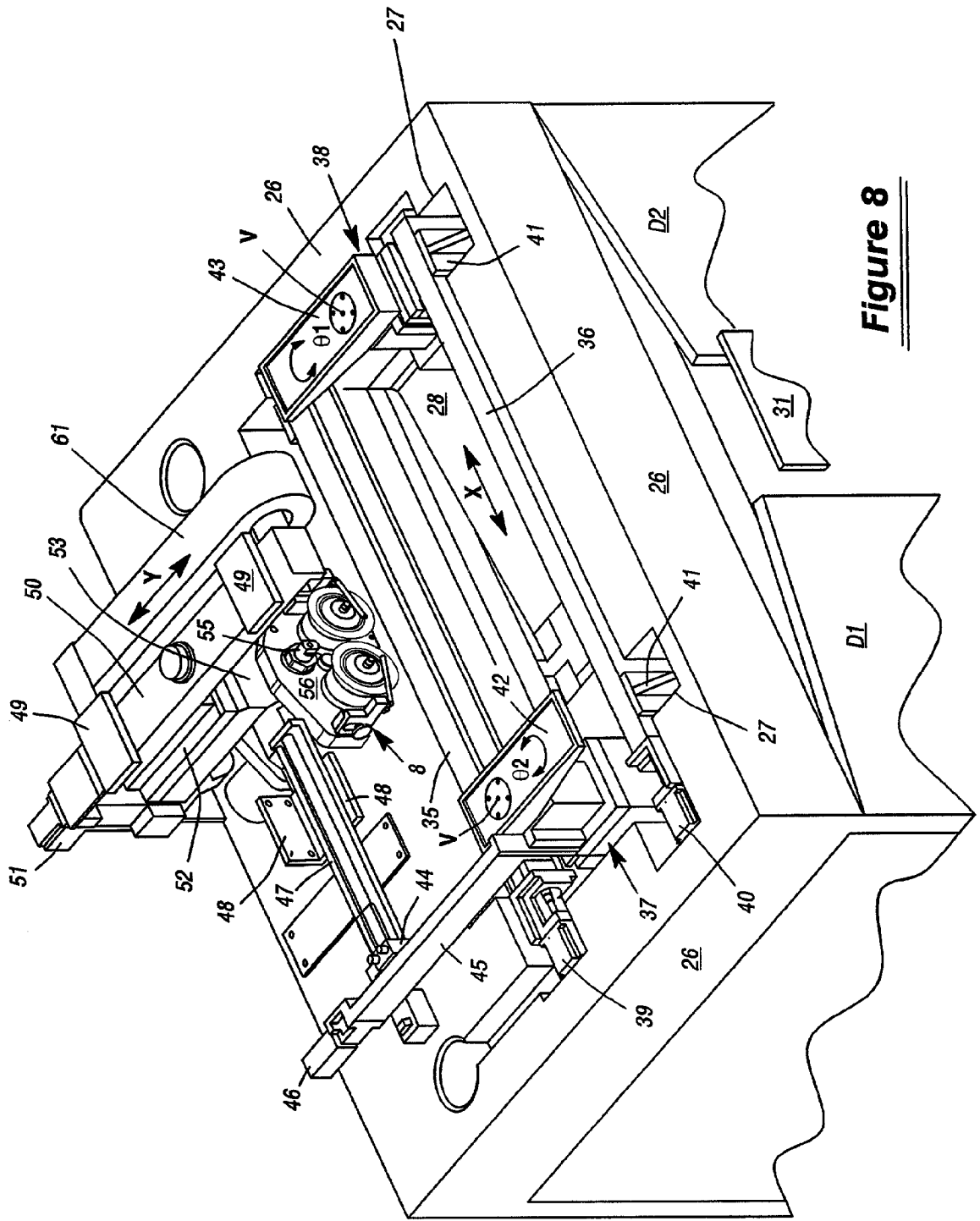
FIG. 8 is an isometric drawing of the singulation saw showing the counter-rotating cutting saw blades and the Y-axis positioning drive for the saw blades, and a support gantry for the rocking frame or head that supports the saw blades.

Refer now to FIG. 8 showing an isometric drawing of the singulation saw 8 showing the counter-rotating saw blades and a Y-axis positioning drive for the saw and the support gantry for the working head that supports the dual spindle saws. The linear actuators 35 and 36 are shown supporting their carrier supports 37 and 38 mounted on mounting and alignment blocks 41 which fit into the recesses 27 of the base or support 26 for the saw 8. It will be noted that the substrate carriers 42 and 43 at the top of the carrier supports 37 and 38 are adapted to receive rectangular substrate strips and are provided with a vacuum source V which extends below the substrate (not shown) and that the substrate carriers 42 and 43 are accurately positionable from one position shown to an orthogonal position 90 degrees from that shown so that the substrate carriers may pass each other during operation of the transport system. The novel system includes a vision system comprising a vision system camera 44 mounted on a Y-axis linear actuator 45 comprising a Y-axis motor 46. The Y-axis actuator is moveably mounted on a mounting bracket 48 which mounts on the base or support 26. It will be understood that the camera 44 may be accurately positioned in X and Y over a substrate carried by one of the substrate carriers 42 or 43 in either of their orthogonal positions when at the left-most vision station end under the vision camera system position as shown at substrate carrier 42.

Figure 9:
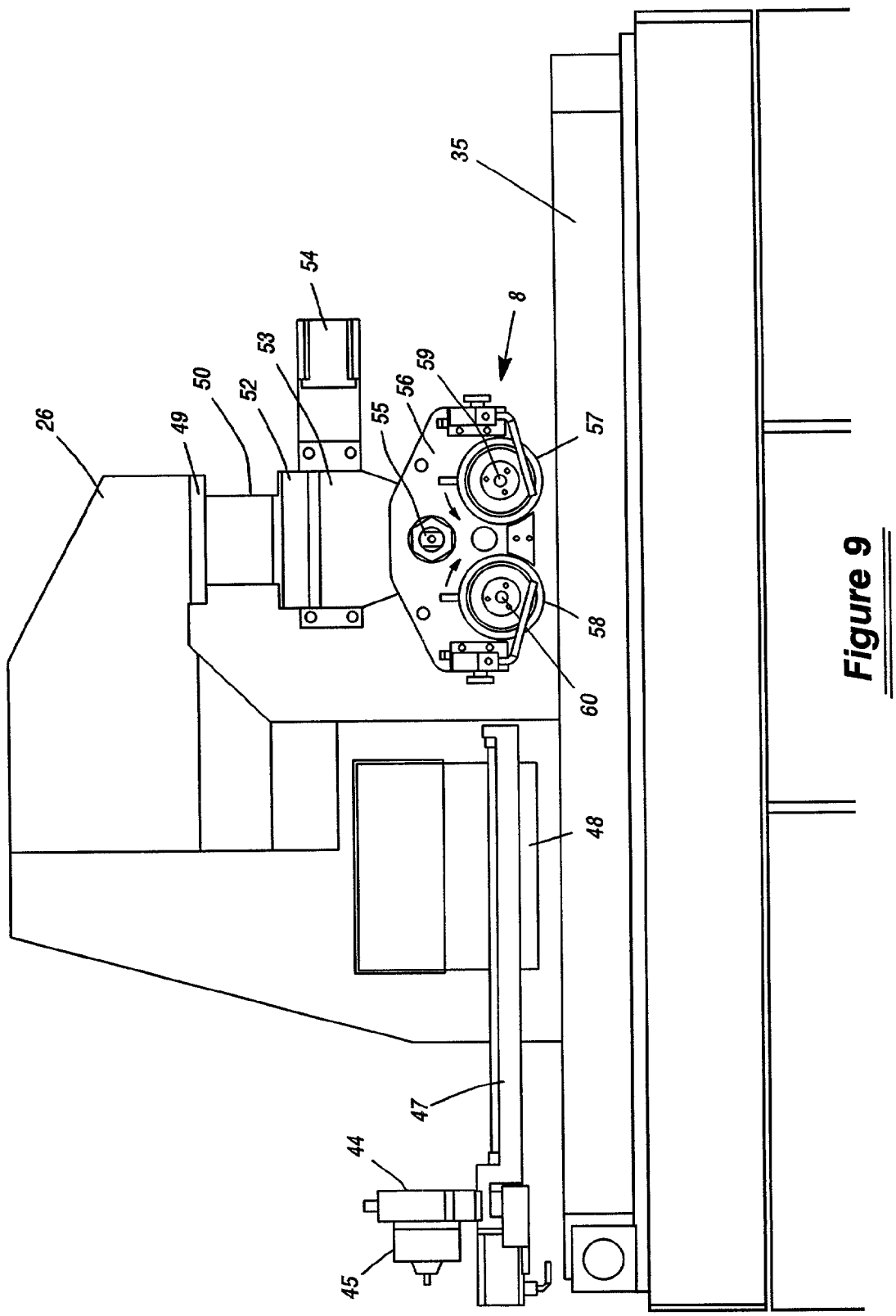
FIG. 9 is front elevation of the singulation saw of FIG. 8 showing the vision system and the rocking drive motor for positioning the saw blades in a Z-axis.

Refer now to both FIGS. 8 and 9 showing the singulation saw 8 which is supported by the base or support 26 through a mounting plate or block 49 which supports a Y-gantry 50. The Y-gantry 50 is coupled to the upper fixed frame 53 through a spacer 52 for movement in the Y-axis. The upper frame 53 supports the lower rocking frame 56 and its rocking shaft 55 which is fixed to the lower rocking frame 56 for movement by the rocker drive motor 54. The rocking frame 56 supports spindles 59 and 60 and their drive motors which are mounted on the rocking frame 56 and carry the counter-rotating saw blades 57 and 58.

Figure 10:
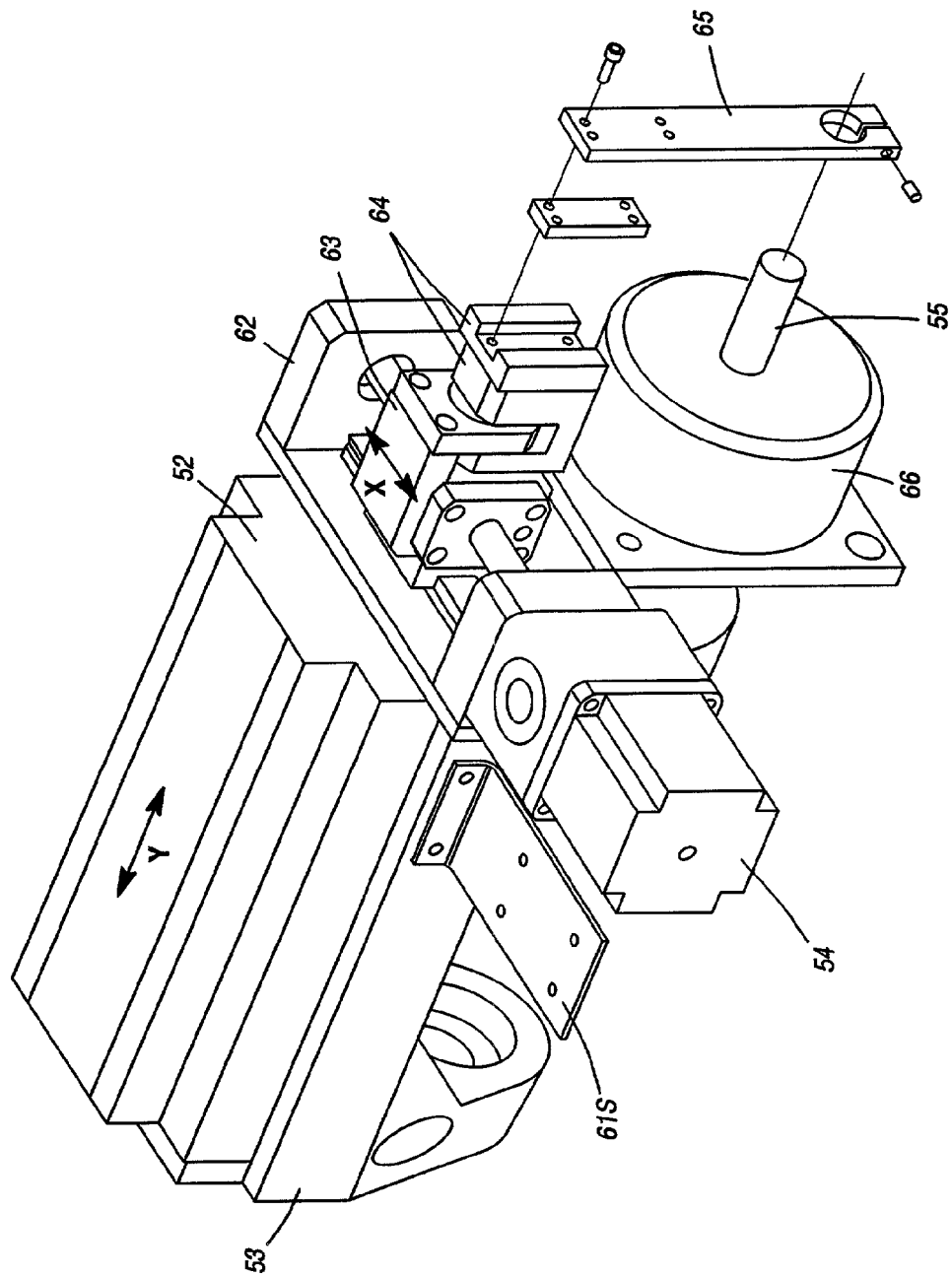
FIG. 10 is an isometric drawing of the rocking head drive motor and its linkage system for positioning the saw blades in a Z-axis.
Figure 11:
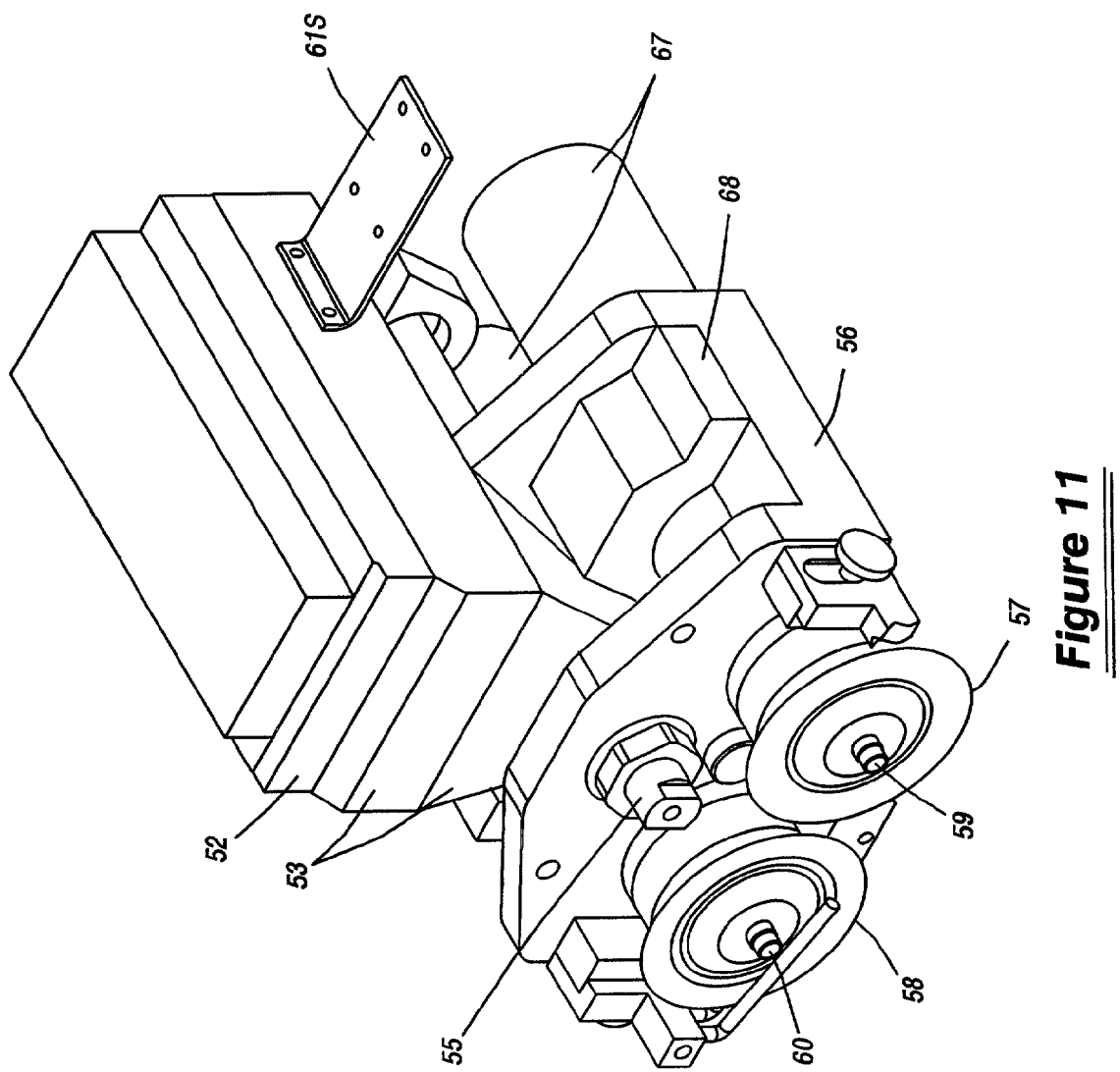
FIG. 11 is an isometric drawing of the counter-rotating saw blades and their spindle drive motors mounted on a rocking head support that is positioned by the locking drive motor shown in FIG. 10.

Refer now to FIG. 10 showing an isometric drawing of the rocking frame drive motor and the linkage system for positioning the saw blades in a Z-axis. Also refer to FIG. 11 showing an isometric drawing of the counter-rotating saw blades 57 and 58 and their spindle drives 59 and 60 mounted on the lower rocking frame 56 that is positioned by the rocking drive motor 54. The upper fixed frame 53 is shown attached to the spacer adapter 52 for movement in the Y-axis by the Y-axis drive motor 51. A support bracket 61S is mounted on the side of the fixed frame 53 for supporting the flexible E-chain 61 shown in FIG. 8. The rocking drive motor 54 is shown mounted on a bearing block bracket 62 and coupled to lever drive block 63 for linear movement. The drive block 63 is mounted through a pivot to a pivot block 64 for driving a lever assembly 65. The lever 65 is fixed to the rocker drive shaft 55 which extends through the upper fixed frame 53 and is fixedly attached to the rocker frame 56. Thus, it will be understood that when the rocker drive motor 54 is actuated it can pivot the lever 65, rotate the shaft 55 which is attached to the lower rocker frame and rocks the rocking frame and moves the singulation saw blades 57 and 58 in the Z-axis. Further, there is provided a brake 66 which couples to a disc on the shaft 55 and may be actuated to fix the saw blades 57 in a Z-direction once they are properly positioned for sawing or singulating a substrate. FIG. 11 shows the spindle drive motors 67 for the spindle systems 59 and 60 and also show the clamp bracket 68 for holding the spindle drive systems 59 and 60 in the lower rocking frame 56.

Having explained FIGS. 9, 10 and 11 showing the rocking frame 56 and the system for rocking the rocker drive shaft 55, it will be understood that the rocker drive motor is preferably a stepping motor which can be rotationally positioned to a high degree of accuracy for imparting a high degree of rotational accuracy to the rocker shaft 55 which in turn imparts a high degree of Z-movement to the singulation cutting blades 57 and 58.

Figure 12:
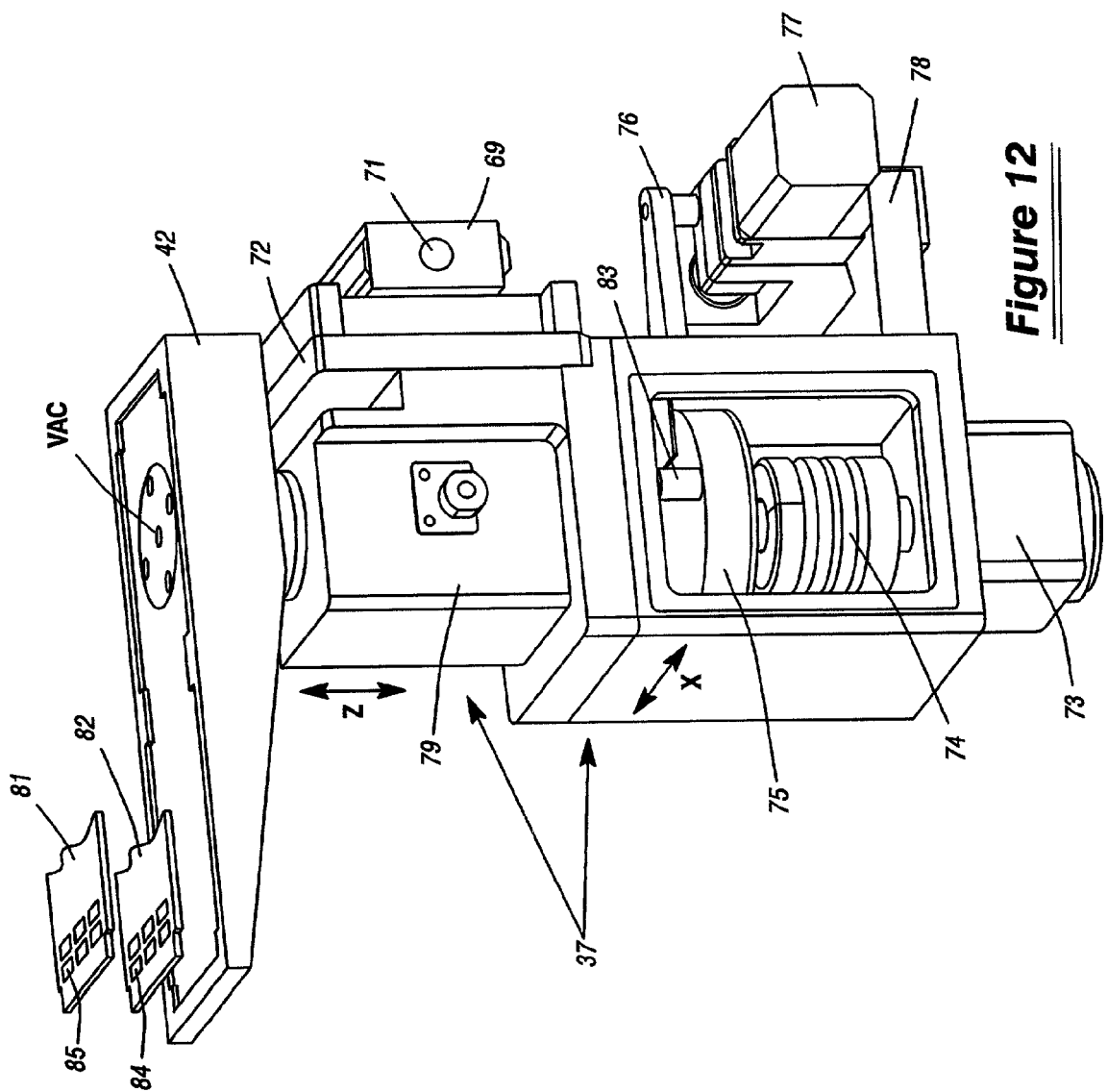
FIG. 12 is an enlarged isometric drawing of one of the substrate carrier support systems showing a preferred embodiment support system for gross and fine positioning of a substrate in two orthogonal cutting positions.

Refer now to FIG. 12 showing an enlarged isometric drawing of the one the substrate carrier supports 37 showing a preferred embodiment system for both gross and fine positioning a substrate in two orthogonal cutting positions 90 degrees from each other. The carrier support 37 is carried by a bearing block 69 which has an aperture 71 for receiving a ball screw (not shown). The bearing block is mounted on a mounting bracket 72 which supports the system identified as a carrier support 37. The carrier support 37 comprises a rotary actuator 73 for gross positioning the substrate carrier 42 in one of two preferred orthogonal positions. A coupling 74 is mounted between the actuator 73 and a driven disc 75 which has a lever arm 76 mounted thereto. The lever arm 76 is driven in an X-axis direction by a fine positioning theta motor 77 mounted on a bracket 78. It will be understood that the coupling 74 does not directly couple to the disc 75 but is coupled through a mechanism which allows the rotary actuator 73 to position the pins 83 in one of two rotary positions. Mounted above the disc 75 is bearing housing 79 which is adapted to provide a Z-motion to the substrate carrier when the substrate carrier needs to be positioned in a Z-axis to avoid collision of the substrate carriers 42 and 43 when they are adapted to carry large wafers. In the preferred embodiment of the present invention the substrate carrier support 37 employs an adapter plate 81 and gasket 82 which is designed to mate with the devices on a particular substrate to be sawn so that the vacuum system is applied to each of the substrate apertures 84 which apply the vacuum to the gasket apertures 85 which coincide in position with the devices on the substrate so that when the devices are singulated, the vacuum continues to hold the device even though it is separated from other devices. However, the vacuum system does not hold the edges of the substrate which are sawn loose from the outer perimeter or the streets between the devices which fall down into the sink 28 in the base 26.

Figure 13:
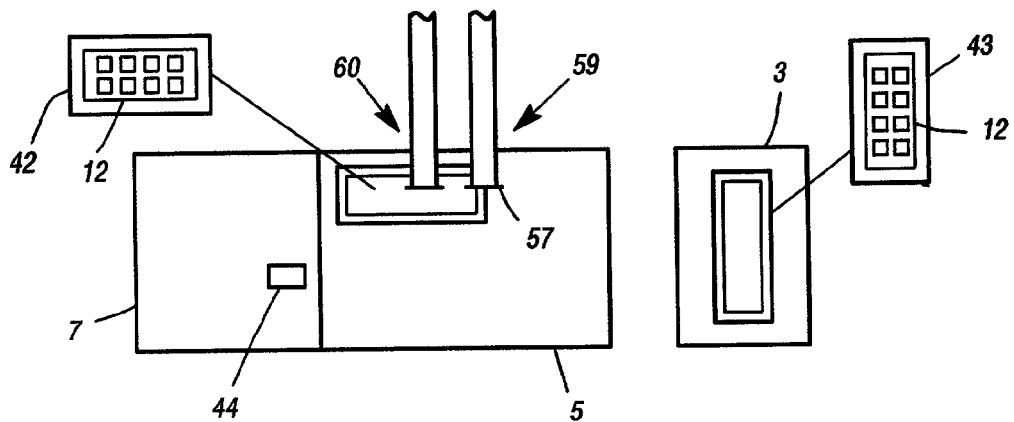
FIG. 13 is a schematic plan drawing of the front carrier in a short axis loading position and the rear carrier in a long axis cutting position.

Refer now to FIG. 13 showing a schematic plan drawing of the front carrier 43 in the loading position and the rear carrier 42 in the long axis cutting position. It will be observed that the block 7 defines the vision station and the block 5 defines the cutting station and the block 3 defines the loading and unloading station in this figure. While the substrate 12 in the cutting position is being cut, the substrate 12 in the loading and unloading position 3 is being unloaded and loaded with a new substrate 12 for subsequent cutting.

Figure 14:
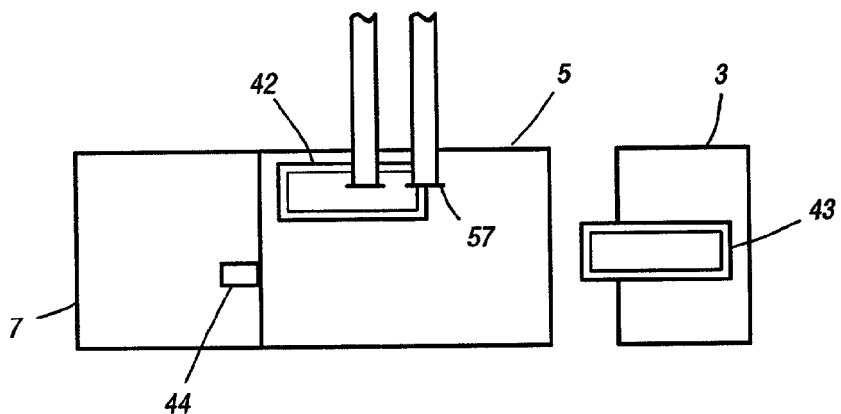
FIG. 14 is a schematic plan drawing of the front carrier rotated to permit passage by the rear carrier in the long axis cutting position.

Refer now to FIG. 14 showing a schematic plan drawing of the front carrier 43 rotated to a long axis position to permit passing the rear carrier 42 in the long axis cutting position.

Figure 15:
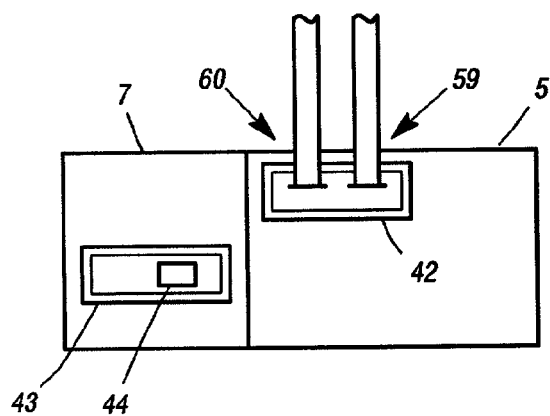
FIG. 15 is a schematic plan drawing of the front carrier positioned below the vision system while the rear carrier is still in the long axis cutting position.

Refer now to FIG. 15 showing a schematic plan drawing of a front carrier 43 positioned below the vision system 44 while rear carrier 42 is still in the long axis cutting position in the cutting station 5.

Figure 16:
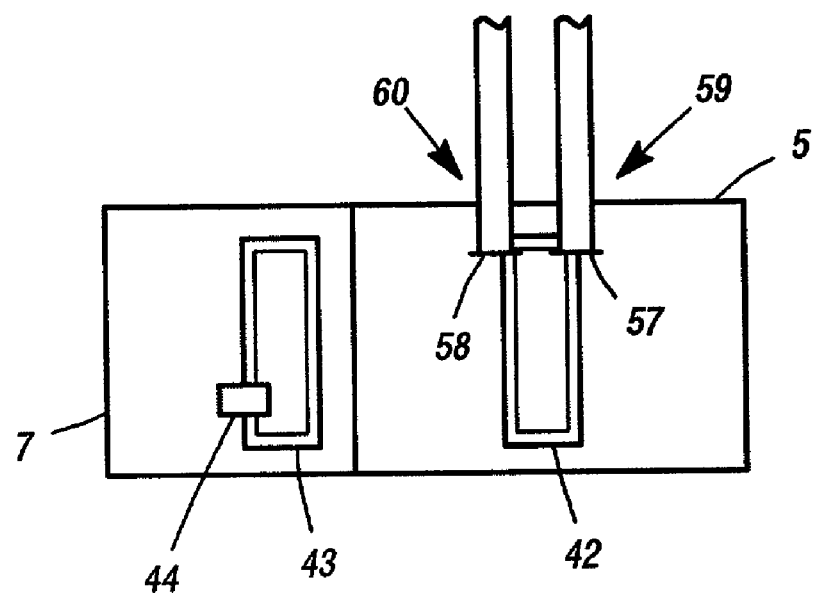
FIG. 16 is a schematic plan drawing of the front carrier rotated 90 degrees and still positioned below the vision system and the rear carrier has rotated so that the singulation saw is cutting in the short axis cutting position.

Refer now to FIG. 16 showing a schematic plan drawing of the front carrier 43 positioned below the vision system 44 while the rear carrier 42 is positioned in the short axis cutting position in the cutting station 5.

Figure 17:
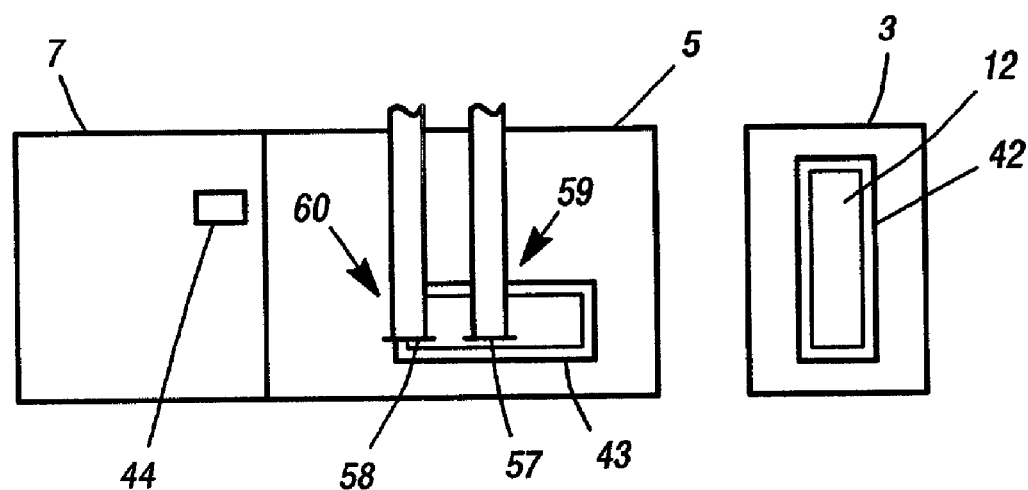
FIG. 17 is a schematic plan drawing of the front carrier after being positioned in the vision system and the saw is now cutting in the long axis cutting position while the rear carrier is positioned in the right-most position for unloading a singulated substrate and for subsequently loading a new substrate to be singulated.

Refer now to FIG. 17 showing a schematic plan drawing of the front carrier 43 after being positioned by the vision system 44 and moved into the cutting station in the long axis cutting position while the rear carrier 42 is positioned in the right-most position for unloading a singulated substrate 12 and for loading a new substrate 12 to be singulated.

Figure 18:
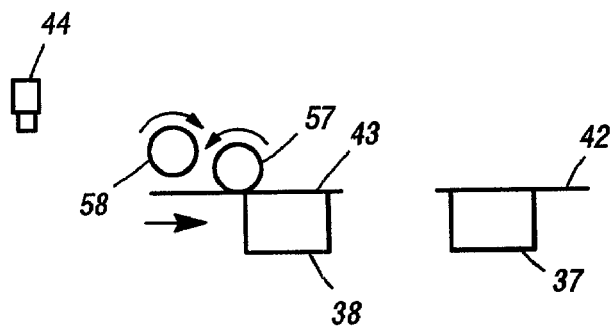
FIG. 18 is a schematic elevation drawing of the front carrier moving in the plus X direction while being cut by the right-most saw blade moving in a counter-clockwise direction.

Refer now to FIG. 18 showing a schematic elevation drawing of the front carrier 43 moving in the plus-X direction while being cut by the saw blade 57 moving in a counter-clockwise direction.

Figure 19:
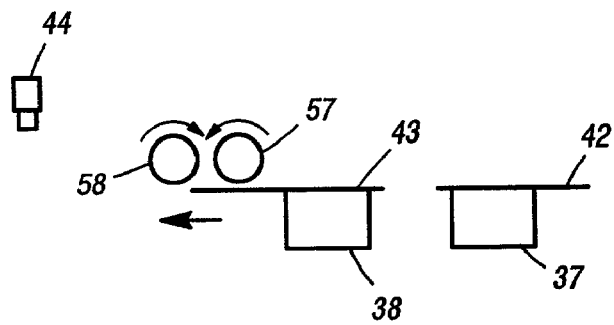
FIG. 19 is a schematic elevation drawing of the singulation saw of FIG. 18 after completion of the plus X direction cut and the two saw blades are raised to a neutral or non-cutting position.

Refer now to FIG. 19 showing a schematic elevation drawing of the singulation saw 8 of FIG. 18 after completion of the plus-X direction cut and the two saw blades 57 and 58 are raised to a neutral or non-cutting position.

Figure 20:
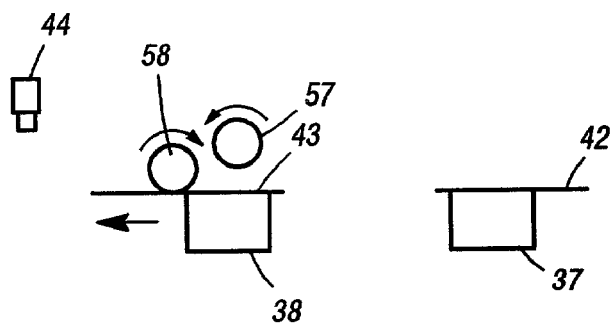
FIG. 20 is a schematic elevation drawing of the singulation saw of FIGS. 18 and 19 after the beginning the minus X direction cut with the carrier moving in the minus X direction to engage the left-most saw blade rotating in the clockwise direction.

Refer now to FIG. 20 showing a schematic elevation drawing of the singulation saw 8 of FIGS. 18 and 19 after beginning the minus-X direction cut moving the substrate carrier 43 in the minus-X direction for engagement with the left-most saw blade 58 rotating in a clockwise direction.

Refer now to Table 1 which is designed to show the difference between the prior art and the present invention which saves considerable time without having to use both an unload and a load station.

TABLE 1

1. Load
2. Position the substrate on the carrier
3. Move the substrate relative to the vision system
4. Vision align the substrate
5. Reposition the substrate for a first cut
6. Lower the blade outside of the substrate
7. Move the substrate through the saw blade at cutting speed
8. Raise the saw blade
9. Retract the substrate at high speed
10. Reposition the Y-axis of the saw blade TABLE 1-continued 11. Rotate the substrate 90 degrees and repeat the cutting sequence
12. Move the substrate to a load/unload station
13. Unload the singulated strip It will be noted that the cutting sequence numbered 6 through 10 happens multiple times until the substrate is completed sawn in one direction. After rotating 90 degrees then the identical sawing sequence is repeated using the steps shown 6 through 10 a different number of times. Once the substrate is completely cut or singulated it is then moved to the unload station where the singulated strip is removed and an uncut strip is replaced on the carrier.

The steps 1 through 5 in the present invention are being performed simultaneously with the operation which occurs in the steps 6 through 11. Further the preferred embodiment invention cuts in two directions; thus, the step shown at step 9 where the saw blade is retracted is completely eliminated and the cutting operation is performed at least 15 percent faster using the same linear movement of the substrate and the same rotational blade speed.

Having explained a preferred embodiment dual spindle saw using counter-rotating saw blades to enable a reciprocating substrate to be cut in two directions of horizontal movement under saw blades that remain fixed in the Z-direction, it will now be understood that the rocking frame which supports the dual spindles may be replaced by two independent Z-actuators each of which support one spindle and is independently programmable in the Z-direction at greater expense.

Similarly, the saw blades in the saw system could be replaced by a laser saw system incorporating the novel transport system to unload and load substrates to be singulated while the cutting operation is being performed on a different substrate. Presently, the dual spindle saw blades cut faster and cooler than any known commercially available laser. It is known that lasers cut hot and slower than saw blades and are considered to be a less desirable modification than the preferred embodiment described herein.

An example of the benefit of the present invention is that two identical substrates were cut, one using the best prior art system known and the other using the present invention. The best prior art invention saw required 183 seconds to singulate two substrates while the present invention did the identical or superior cutting operation in 133 seconds. This results in an approximately 37-½ percent faster cutting time.

Prior art dicing saws use several liters of expensive deionized water to cool flush and clean a wafer during cutting. Since cutting time is reduced by the present invention, so is the amount of deionized water needed.

In a preferred embodiment singulation saw, it is possible to further reduce actual cutting time by starting each cut in each direction by moving the saw blade vertically to engage the substrate and simultaneously starting horizontal movement. For lack of a better descriptive name this start cut is called a plunge cut. In similar manner at the end of a cut when the saw blade breaks through the bottom edge, the saw blade may be immediately moved upward to a neutral position in a motion which is the reverse of a plunge cut. As soon as the blade is clear of the substrate being cut the Y-axis gantry positions the rocking frame (or head mount) ready for the next plunge cut and start of singulation of a substrate.

What is claimed is:

1. A cutting system for use in singulation of substrates and dicing of wafers, comprising:

a first and a second linear transport means arranged parallel to each other; wherein the first transport means comprises a first linear actuator and a first carrier support moveable by the first linear actuator; wherein the second transport means comprises a second linear actuator and a second carrier support moveable by the second linear actuator; and wherein each of the first and second linear transport means has three sequential points separated from each other and serving as a load/unload station, a vision position station, and a singulation/cutting station for the first carrier support and the second carrier support; wherein the first and second linear actuators are parallel to one another, and each carrier support moves along the corresponding linear actuator and stops at each one of the stations;

means for positioning the first carrier support and the second carrier support sequentially from the load/unload station to the vision position station and then to the singulation/cutting station; wherein the first carrier support and the second carrier support reciprocally move in an X-axis direction from and to the singulation/cutting station; and singulation/cutting means for separating semiconductor type substrates/wafer devices one from another by cutting the substrate/wafer as it passes in both X directions; wherein the substrate/wafer is mounted on the carrier supports; and wherein the cutting of the substrate/wafer on the first/second carrier support on the first/second linear transport means may be done when the loading/unloading and positioning the substrate/wafer on the second/first carrier support ready for cutting on the second/first second linear transport means, thereby reducing lost cutting time to a minimum.

2. The cutting system of claim 1 wherein said substrate/wafer is a rectangular strip and said carrier support is adapted to receive an adapter plate and a gasket for supporting said strip on said carrier support.

3. The cutting system of claim 2 wherein said carrier support comprises means for rotating said strip exactly 90 degrees from a predetermined position.

4. The cutting system of claim 1 wherein said carrier support comprises means for vertically positioning substrates carriers.

5. The cutting system of claim 1 wherein said singulation cutting means comprising blade support means, and
a pair of counter-rotating saw blades mounted on said blade support means for vertical movement and for engaging one of said saw blades into engagement with a substrate/wafer when moved in a first X direction and for engagement with the other said saw blades when moved in a direction opposite to said first X direction.

6. The cutting system of claim 5 wherein said blade support means comprises a rocking frame mounted on a pivot shaft.

7. The cutting system of claim 6 wherein said pivot shaft is moveable in a clockwise and/or a counter-clockwise position to position one of said saw blades in a downward Z direction.

* * * * *